Dec. 15, 1953   E. M. GREENLEE   2,662,423
SAW SHARPENING FILE-GUIDE
Filed Nov. 16, 1951
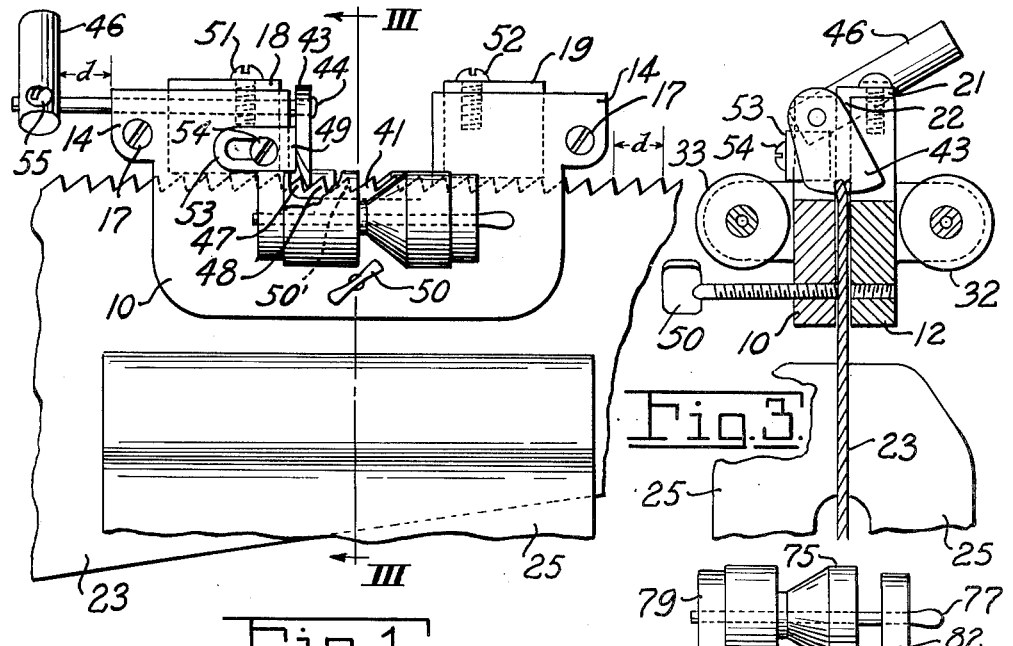
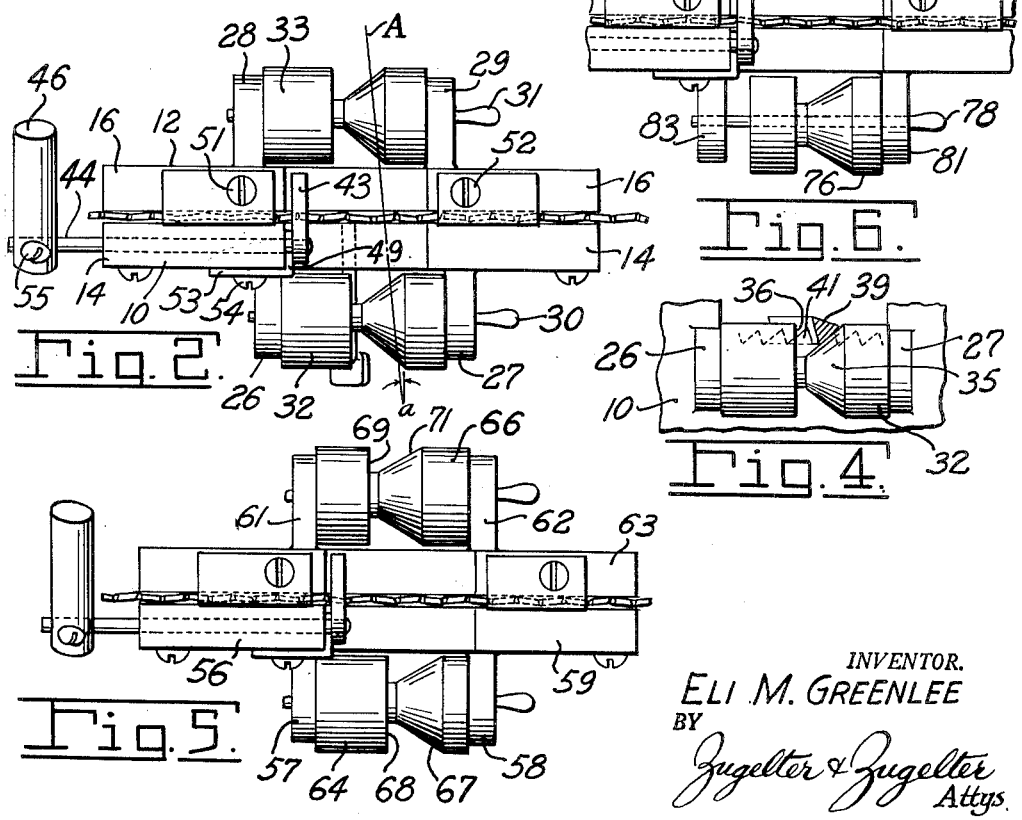
INVENTOR.
ELI M. GREENLEE
BY
Zugelter & Zugelter
Attys.

Patented Dec. 15, 1953

2,662,423

UNITED STATES PATENT OFFICE 2,662,423

SAW SHARPENING FILE-GUIDE

Eli M. Greenlee, Newport, Ky.

Application November 16, 1951, Serial No. 256,657

2 Claims. (Cl. 76—36)

This invention relates to saw sharpening file-guides.

An object of this invention is to provide a saw sharpening file-guide by means of which the file may be operated at a uniform and proper angle on each tooth of a saw.

A further object of this invention is to provide a guide having a frame or carriage for mounting on the edge of a saw blade containing the saw teeth, and which is provided with rollers so constructed and arranged that they will support and guide a file at the proper filing angle during the sharpening strokes of the file.

A further object of this invention is to provide a guide having mechanism whereby the carriage and rollers can be moved along the saw a distance equal to the space of two saw teeth so that every second tooth of the saw can be filed as the guide is advanced along the saw from heel to toe and vice versa.

The above and other objects and features of the invention will in part be apparent and will in part be obvious from the following detailed description and the drawing, in which:

Figure 1 is a view in side elevation showing a guide constructed in accordance with an embodiment of this invention, the guide being shown mounted on a saw, only a portion of the saw being shown;

Fig. 2 is a plan view of the guide shown in Fig. 1;

Fig. 3 is a view in section taken on a line III—III in Fig. 2;

Fig. 4 is a fragmentary view partly in elevation and partly in section, showing a file in position to be guided at filing angle by the rollers of the guide;

Fig. 5 is a plan view showing a guide constructed in accordance with another embodiment of this invention; and Fig. 6 is a fragmentary plan view showing a guide constructed in accordance with a further embodiment of this invention.

In the following detailed description, and the drawing, like reference characters indicate like parts.

The device shown in Figs. 1 to 4 inclusive includes a frame or carriage made up of two spaced members 10 and 12. Each of the members 10 and 12 is generally of U-shape. At or near the upper ends of the legs or sides of the U-shaped members 10 and 12, lugs or ears 14 and 16, respectively, are provided to accommodate screws 17 by means of which members 10 and 12 are held together in face-to-face relation.

Adjacent faces of members 10 and 12 are flat and are spaced by angle-shaped spacers or guide support members 18 and 19. As shown in Fig. 3, each spacer includes an upper flange 21 and a depending flange 22 that lies between members 10 and 12. Flanges 22 are clamped between side members 10 and 12, but are adjustable to accommodate saw teeth of various sizes, as will be explained, infra. Flanges 22 provide a space between members 10 and 12 of sufficient width to accommodate a saw blade.

As shown in Figs. 2 and 3, the lower edges of flanges 22 of the spacers rest on the points of the saw teeth of a saw blade 23 so that the frame of the guide is carried by the saw teeth. When the teeth of the saw blade are being sharpened, the blade is held in the jaws 25 of a vise and the guide is advanced along the blade as the teeth are sharpened.

Member 10 carries a pair of outwardly projecting spaced posts 26 and 27, at opposite ends of the base thereof, and member 12 carries a similar pair of posts 28 and 29. The posts form supports for journal pins 30 and 31 which are parallel to the saw receiving slot of the frame or carriage. File guide rollers 32 and 33 are rotatably mounted on pins 30 and 31, respectively.

As shown most clearly in Fig. 4, roller 32 is provided with a notch having a conical face 35 and a radial face 36. Similarly, roller 33 is provided with corresponding conical and radial faces (see Fig. 2).

As shown in Fig. 2, posts 26 and 27 of member 10 are offset from posts 28 and 29 of member 12 so that when a file is drawn across the saw teeth in the direction of a line A, a proper bevel is given to the teeth. Line A extends transversely of the saw blade at an angle "$a$" to the normal transverse line.

As shown in Fig. 4, a file 39 is supported by the rollers at a proper angle for filing the teeth of the saw. The file rests on the rollers and can be drawn back and forth with one face of the file engaging a saw tooth 41, to sharpen the cutting face of tooth 41.

As is well known, it is necessary to file every second tooth of a saw in the same direction, and mechanism is included in the guide for advancing the guide along the saw blade a distance equal to the space or length of two saw teeth each time the guide is moved. This mechanism includes a finger 43 which extends into the notch between a pair of saw teeth. Finger 43 is carried by a shaft 44. Shaft 44 in turn is rotatably mounted in the upper portion of one of the legs of member 10. Shaft 44 carries a handle 46, by means of which the shaft and finger can be turned. When finger 43 is disposed in the notch between a pair of saw teeth 47 and 48 (Fig. 1), the guide can be advanced until finger 43 engages a stop member 49. Then the guide is in proper position so that tooth 41 can be filed therewith. When the guide is in this position, the guide can be held in place by a set screw 50. Then, when tooth 41 has been filed, set screw 50 is released and handle 46 is turned in a counterclockwise direction, as shown in Fig. 3, to release the finger from the saw teeth so that the handle and shaft can be moved to the right, as shown in Fig. 1, a distance "$d$" equal to the length of two saw teeth to bring the handle against lug 14. Next, the handle is swung clockwise, as shown in Fig. 3, to bring the finger into the notch between saw teeth 50' and 41. Then the carriage can be advanced to the right, as shown in Fig. 1, the distance "d" equal to the length of two saw teeth, whereupon another tooth may be filed.

The guide can be adjusted for depth and length of saw teeth. When the guide is to be adjusted with relation to the depth of the teeth, screws 17 are loosened to release the engagement between the side members and spacers. Then, adjustment screws 51 and 52 can be turned to raise or lower the side members across the saw blade.

As shown in Figs. 1 and 3, each of the adjustment screws 51 and 52 passes through an opening in the upper flange of one of the spacers and is threaded into one of the legs of member 12 so that, when the adjustment screws 51 and 52 are turned, the side members are raised or lowered.

The position at which the guide stops when advanced along the saw blade can be adjusted by moving stop 49. As shown in Figs. 1 and 2, stop 49 is attached to member 10 by means of a slotted flange 53. The flange 53 is held against member 10 by a screw 54. Screw 54 can be loosened to permit the stop to be adjusted to arrest the guide in proper position.

The guide can further be adjusted to accommodate saw blades having teeth of varying length. As shown, handle 46 is attached to shaft 44 by a set screw 55. Set screw 55 can be loosened to permit the handle to be moved along the shaft to adjust the distance "d" through which the shaft 44 and index finger 43 can be moved.

The device illustrated in Figs. 1-4 inclusive is suitable for filing all of the teeth of a file which are cut or beveled on one direction. The other teeth of the saw may be filed with the aid of a second guide (not shown) similar to the guide illustrated in Figs. 1-4 inclusive, except that the posts and rollers of the second guide are offset to give a bevel in the opposite direction.

In Fig. 5 is shown a saw sharpening guide suitable for filing all of the teeth of a saw. The guide illustrated in Fig. 5 is similar to that illustrated in Figs. 1-4 inclusive, except that posts 57 and 58 on a side member 59 are directly opposite posts 61 and 62, respectively, of a side member 63. Posts 57 and 58 support a roller 64, and posts 61 and 62 support a roller 66. Roller 64 is provided with a conical face 67 and a radial face 68, while roller 66 is provided with a radial face 69 and a conical face 71. Radial face 69 of roller 66 is closer to the left hand end of the roller than is radial face 68 of roller 64, so that the faces of the rollers are offset from each other, and, when a file is guided by the rollers 64 and 66, the file can engage a saw tooth at the proper angle for filing the saw. When all of the teeth which are beveled in one direction have been filed, rollers 64 and 66 can be transposed, whereupon the remaining teeth may be filed.

In Fig. 6 is shown another guide suitable for sharpening all of the teeth of a saw. The guide illustrated in Fig. 6 is similar to that illustrated in Fig. 5 with the exception that rollers 75 and 76 are shorter in length than the rollers shown in Fig. 5 and are slidable lengthwise of spindles 77 and 78, respectively. When the rollers are in the position shown in Fig. 6, the rollers form a guideway for supporting a file as saw teeth are filed with a bevel directed upwardly and to the left, as seen in Fig. 6. In this position, roller 75 engages a post 79 and roller 76 engages a post 81. Then, the rollers can be shifted to bring roller 75 into engagement with a post 82 and roller 76 into engagement with a post 83. In the latter position, the rollers are in position to form a guideway for supporting a file as saw teeth are filed with a bevel directed upwardly and to the right.

The guides illustrated in the drawing and described above are subject to structural modification without departing from the spirit or scope of the appended claims.

Having described my invention, what I claim as new and desire to secure by Letters Patent, is:

1. A saw sharpening file guide which comprises a pair of U-shaped frame members, said frame members being in registry, the bases of said frame members being spaced to form a saw blade receiving slot therebetween, guide support members extending between respective pairs of arms of the frame members, said guide support members being adapted to rest on the teeth of the saw blade to support the guide with other teeth exposed above the bases of the frame members, and a roller journaled on the base of each frame member, each of said rollers having a file supporting conical face, said faces forming a guideway for supporting a file during the filing of one of the exposed saw teeth, the rollers being slidable axially along their journals between a first position in which the rollers are adapted to support a file during filing of a saw tooth beveled in one direction and a second position in which the rollers are adapted to support a file during filing of a saw tooth beveled in the opposite direction.

2. A saw-sharpening file guide which comprises a pair of parallel upright plate frame members, each of said members having a notch in its upper portion, the notches of the frame members being in registry, the frame members being spaced to form a slot for receiving a saw blade therebetween with a plurality of teeth projecting above the bases of the notches, guide support members disposed between the frame members and attached thereto on either side of the notches, said guide support members being adapted to rest on the teeth of the saw blade to support the guide with other teeth exposed above the bases of said notches, a roller journaled on the base of each frame member, each of said rollers having a file supporting conical face, the faces forming the guideway for a file for filing one of the exposed saw teeth, a shaft extending parallel to the slot and rotatably and slidably mounted in one of the frame members, a finger attached to the shaft to turn therewith, said finger having an end engageable in the space between a pair of teeth of the saw blade, and a stop for limiting the sliding of the shaft, whereby, when the finger is engaged in the space and the guide is moved along the saw blade, the guide is moved a distance equal to the spacing of two saw teeth.

ELI M. GREENLEE.

References Cited in the file of this patent

UNITED STATES PATENTS

| Number | Name | Date |
| --- | --- | --- |
| 286,348 | Torrence et al. | Oct. 9, 1883 |
| 735,100 | Hormby | Aug. 4, 1903 |
| 1,003,904 | Higbee | Sept. 19, 1911 |
| 2,038,628 | Barr | Apr. 28, 1936 |
| 2,083,586 | Woodbury | June 15, 1937 |
| 2,171,169 | Woodbury | Aug. 29, 1939 |
| 2,420,468 | De Walt | May 13, 1947 |

FOREIGN PATENTS

| Number | Country | Date |
| --- | --- | --- |
| 16,273 | Great Britain | July 23, 1903 |